(12) United States Patent
Knapper et al.

(10) Patent No.: US 11,536,404 B2
(45) Date of Patent: Dec. 27, 2022

(54) HYDRAULIC COUPLING BUSH

(71) Applicant: Robert Bosch GmbH, Stuttgart (DE)

(72) Inventors: Steffen Knapper, Vaihingen/Enz (DE);
Frank Rieckhof, Ludwigsburg (DE);
Markus Grammer, Ludwigsburg (DE);
Reiner Kunz, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/507,238

(22) Filed: Oct. 21, 2021

(65) Prior Publication Data

US 2022/0146025 A1 May 12, 2022

(30) Foreign Application Priority Data

Nov. 9, 2020 (DE) ..................... 10 2020 214 024.3

(51) Int. Cl.
*F16L 37/32* (2006.01)
*F16L 29/00* (2006.01)
*F16L 37/23* (2006.01)

(52) U.S. Cl.
CPC ............ *F16L 37/32* (2013.01); *F16L 29/007* (2013.01); *F16L 37/23* (2013.01)

(58) Field of Classification Search
CPC . F16L 37/35; F16L 37/32; F16L 37/30; F16L 37/28; F16L 37/23; F16L 29/007
See application file for complete search history.

(56) References Cited

U.S. PATENT DOCUMENTS

| 4,303,098 | A | * | 12/1981 | Shindelar | F16L 37/23 |
|---|---|---|---|---|---|
| | | | | | 137/596.2 |
| 4,373,551 | A | * | 2/1983 | Shindelar | F16L 37/32 |
| | | | | | 137/614.04 |
| 4,549,577 | A | * | 10/1985 | Kugler | F16L 37/23 |
| | | | | | 137/614.04 |
| 4,582,295 | A | * | 4/1986 | Kugler | F16L 37/32 |
| | | | | | 137/614.04 |

(Continued)

FOREIGN PATENT DOCUMENTS

| CN | 105765287 A | * | 7/2016 | ............. F16L 37/23 |
|---|---|---|---|---|
| DE | 10 2009 034 616 A1 | | 2/2011 | |

(Continued)

*Primary Examiner* — David Colon-Morales
(74) *Attorney, Agent, or Firm* — Maginot, Moore & Beck LLP

(57) ABSTRACT

A hydraulic coupling bush which is actuated in order to close or open the coupling includes a coupling housing and a bush body which displaceable therein and which has a plug space for receiving a coupling plug, a supply space for fluidic connection to an external supply channel, a low pressure space for fluidic connection to a pressure medium sink, and an interior space connected fluidically to the supply space, a supply seat valve device being provided, via the actuation of which a supply flow path can be configured between the supply space and the plug space, and a relief seat valve device being provided, via the mechanical actuation of which the interior space can be relieved of pressure toward the low pressure space, and via the hydraulic actuation of which, which is dependent on the pressure in the interior space, the pressure in the interior space can be limited.

16 Claims, 3 Drawing Sheets

(56) References Cited

U.S. PATENT DOCUMENTS

| | | | | |
|---|---|---|---|---|
| 4,745,948 A * | 5/1988 | Wilcox | ............... | F16L 37/32 |
| | | | | 137/614 |
| 4,881,573 A * | 11/1989 | Durant | ............... | F16L 37/56 |
| | | | | 137/614.04 |
| 5,918,633 A * | 7/1999 | Zeiber | ............... | F16L 37/32 |
| | | | | 137/614.04 |
| 5,937,899 A * | 8/1999 | Zeiber | ............... | F16L 37/32 |
| | | | | 251/149.6 |
| 6,116,277 A * | 9/2000 | Wilcox | ............... | F16L 37/62 |
| | | | | 137/614 |
| 6,830,059 B1 * | 12/2004 | Zeiber | ............... | F16L 37/32 |
| | | | | 137/1 |
| 10,156,310 B2 * | 12/2018 | Foner | ............... | F16L 55/07 |
| 2012/0175000 A1 * | 7/2012 | Rusconi | ............... | F16L 37/36 |
| | | | | 137/614 |
| 2012/0181465 A1 * | 7/2012 | Rusconi | ............... | F16L 37/36 |
| | | | | 137/614.04 |

FOREIGN PATENT DOCUMENTS

| | | | |
|---|---|---|---|
| DE | 10 2014 209 278 A1 | 11/2015 | |
| DE | 102014209278 A1 * | 11/2015 | ............... F16L 37/32 |

\* cited by examiner

Detail A

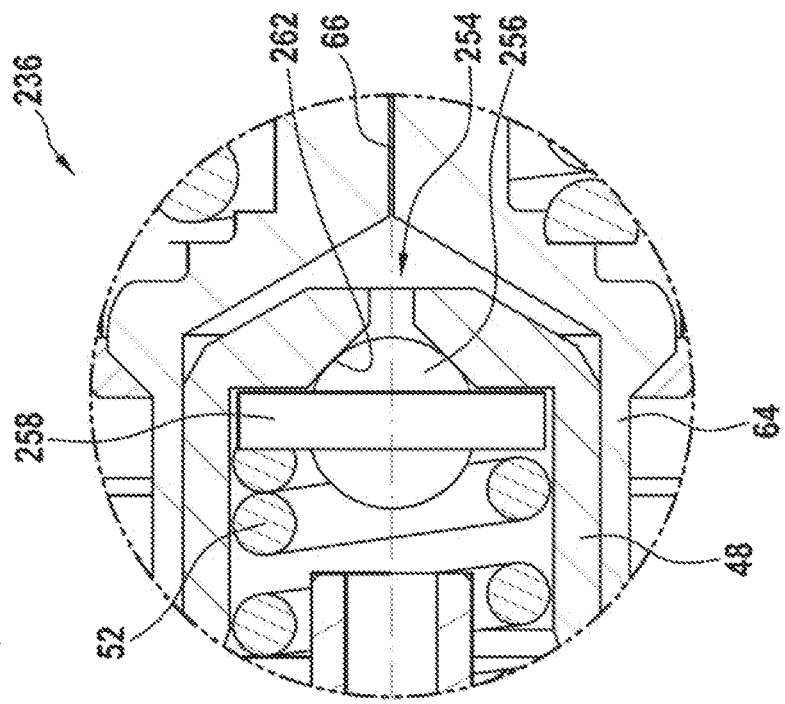
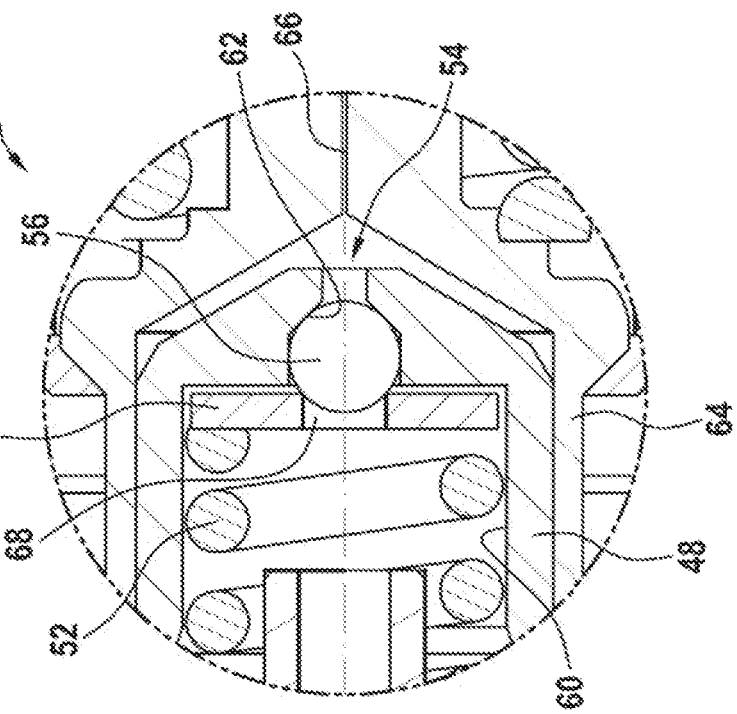

HYDRAULIC COUPLING BUSH

This application claims priority under 35 U.S.C. § 119 to patent application no. DE 10 2020 214 024.3, filed on Nov. 9, 2020 in Germany, the disclosure of which is incorporated herein by reference in its entirety.

The present disclosure relates to a hydraulic coupling bush for use with a hydraulic coupling plug.

BACKGROUND

A coupling bush of the generic type serves for the rapid and leak-free connection and disconnection of hydraulic pressure medium lines. It is arranged, for example, on a valve or control block and, as required, is connected to the corresponding pressure medium line by way of a suitable hydraulic coupling plug. Fundamentally, it has a coupling housing and a bush body which can be actuated displaceably therein. In the latter, two seat valves are configured, of which one controls a pressure medium connection of a (usually lateral) supply channel to a plug receptacle, and the other controls a pressure medium connection of the supply space to a pressure medium sink. The last-mentioned is actuated in the case of actuation of the bush body when the plug receptacle is released in order to receive the hydraulic coupling plug, with the result that the pressure within the bush body is relieved. Thereupon, the actuation and opening of the first-mentioned seat valve takes place mechanically via the introduction of the coupling plug.

One disadvantage of said coupling bush is that pressure medium can be enclosed in a sealed manner in the bush body when both seat valves are closed and the supply space is closed off in the reverse direction, for example by a control valve. If heating then occurs, the pressure in the interior space of the bush body can rise greatly and lead to damage or malfunction.

DE 10 2009 034 616 A1 has therefore disclosed a coupling bush with a pressure limiting valve which is integrated into the bush housing and via which said pressure rise is limited.

A disadvantage of this is the overall design of the coupling bush, since the integrated pressure limiting valve is arranged in a complicated way away from what is otherwise the functional axis of the coupling bush.

The solution of document DE 10 2014 209 278 A1 integrates the pressure limiting valve into the functional axis of the coupling bush. Here, the abovementioned second seat valve assumes not only the above-described pressure relief in the case of mechanical release of the coupling, but rather also the pressure limiting in the interior space. Only the one valve body with an associated valve seat is provided for the two functions. To this end, the valve body can firstly be actuated mechanically in the case of actuation of the bush body, and can secondly be actuated hydraulically in a manner which is dependent on a pressure difference between the internal pressure and the low pressure. Here, the valve body is configured as a hollow body or sleeve, the latter protruding out of the bush body for mechanical actuation and having a precisely manufactured differential face on the outer circumference for its hydraulic actuation, via which differential face the pressure in the interior space is active in the opening direction. The manufacture of said valve body, under the stipulation of it being possible for the two functions of pressure relief and pressure limiting to be fulfilled precisely, is challenging.

SUMMARY

In contrast, the disclosure is based on the object of providing a coupling bush with a pressure relief and pressure limiting function, which coupling bush can be manufactured more simply.

Said object is achieved by way of a coupling bush with the features according to the disclosure. Developments of the disclosure are described herein.

A hydraulic coupling bush for coupling to a hydraulic coupling plug has a coupling housing and a bush body which can be actuated displaceably therein in order to close or open the coupling. The two are preferably of sleeve-shaped configuration. The coupling bush has, in particular on the front side, a plug space for receiving the coupling plug at least in sections and, in particular laterally, a supply space for fluidic connection to an outer supply channel and, in particular on the rear side, a low pressure space for fluidic connection to a pressure medium sink or a tank. The supply space is connected fluidically to an interior space of the coupling bush. A supply seat valve device is provided which can be actuated and opened, in particular mechanically via the coupling of the coupling bush to the coupling plug or the introduction thereof into the plug space. Here, a supply flow path can be configured between the supply space and the plug space via said actuation. In addition, a relief seat valve device is provided, via the one actuation (in particular, mechanical actuation) of which the interior space can be relieved of pressure toward the low pressure space, and via the other actuation (in particular, hydraulic actuation) of which, which is dependent on the pressure in the interior space, the pressure in the interior space can be limited. According to the disclosure, the relief seat valve device for said pressure relief has a valve body which can be actuated mechanically, in particular, and has an associated valve seat and, separately therefrom for the pressure limiting, another valve body which can be actuated, in particular hydraulically, in a manner which is dependent on the pressure and has an associated valve seat. They are arranged coaxially or at least substantially coaxially. Within the context of this document, substantially coaxially is complied with if said valve seats and valve bodies are arranged radially within an enveloping surface which can be defined by the outer contour of the largest of its valve bodies in its actuating direction.

The pressure relief function and the pressure limiting function are thus formed by two separate seat valves of the relief seat valve device, and therefore by valve bodies and valve seats which can be manufactured independently of one another. Their coaxial arrangement is advantageous in terms of installation space and function. A design of the individual functions of pressure relief and pressure limiting and their manufacture is thus simplified.

In particular, the coupling bush has a concentric or coaxial construction from the low pressure space toward the plug space with regard to its components which can be moved relative to one another, such as valve bodies, valve seats, springs and/or the like.

In one development, a mechanically actuable valve body of the supply seat valve device and its associated valve seat are arranged coaxially with respect to the abovementioned components.

In one development, the valve bodies of the relief seat valve device have opposed actuating directions. The one (in particular, mechanically actuable) valve body of the relief seat valve device can preferably be actuated into the bush body, and the other (in particular, hydraulically actuable)

valve body can be actuated in the opposite direction. It is thus possible for the two valve bodies to be loaded into their valve seats by the same spring, in particular compression spring.

This is further simplified if, in one development, the valve seats of the relief seat valve device are connected, in particular fixedly, at a constant spacing.

In one development, a first spring is provided as a compression spring, via which the two valve bodies of the relief seat valve device are coupled and are loaded into their respective associated valve seat. The first spring can be an elastomer, a helical spring or a gas spring or the like, a helical spring being suitable for reasons of the standard, the reliability and the device complexity.

In one preferred development, the two valve bodies of the relief seat valve device are loaded into their respectively associated valve seat solely via the first spring. Therefore, no further spring is provided, by which, for example, only one of said two valve bodies is loaded and the other is not.

In one variant, the first spring is configured as a first spring assembly with a plurality of spring elements which are connected in parallel or in series.

In one development, the mechanically actuable valve body of the supply seat valve device and the valve seat of the other (in particular, hydraulically actuable) valve body of the relief seat valve device are coupled and loaded into their respective closing direction via a second spring.

In one variant, the second spring is configured as a second spring assembly with a plurality of spring elements which are connected in parallel or in series.

In one development, the one (in particular, mechanically actuable) valve body of the relief seat valve device and the valve body of the supply seat valve device have opposed actuating directions.

In one development, the one (in particular, mechanically actuable) valve body of the relief seat valve device is dipped or arranged completely within the bush body at least in the case of complete actuation.

In one development, the two valve bodies of the relief seat valve device are arranged and guided at least in sections together in a guiding sleeve, in particular in series on account of the coupling via the first spring.

In one development, the guiding sleeve is pot-shaped, the one (in particular, mechanically actuable) valve body of the relief seat valve device projecting out of a pot opening of the guiding sleeve and preferably having an actuating section there.

In one development, the guiding sleeve is of pot-shaped configuration, the valve seat of the other (in particular, hydraulically actuable) valve body of the relief seat valve device being configured on a pot bottom of the guiding sleeve, which pot bottom, starting from said valve seat, is penetrated in the direction of the interior space by a first throttle bore. The other valve body of the relief seat valve device is thus loaded by the pressure in the interior space, and can limit said pressure by lifting up from its valve seat.

A second throttle bore is preferably connected upstream of the first throttle bore, starting from the interior space. Thus, that pressure medium flow of the pressure limiting which results in the case of a hydraulically actuated valve body can be limited in a targeted manner.

In one development, a sealing section of the other (in particular, hydraulically actuable) valve body of the relief seat valve device is a solid body, in particular a ball or cone, or at least one ball section or cone section.

In one development, said valve body is manufactured at least in sections from metal and/or from plastic.

In one development, the one (in particular, mechanically actuable) valve body of the relief seat valve device is a hollow body, in particular a sleeve with a passage recess.

In one development in this regard, a sealing section of the one (in particular, mechanically actuable) valve body of the relief seat valve device is a radial widened portion on the outer circumference of the valve body.

In one development, in the case of hydraulic actuation of the other valve body of the relief seat valve device, a pressure limiting pressure medium flow path can be configured from the interior space, via the valve seat which is assigned to said valve body, and through the one (in particular, mechanically actuable) valve body of the relief seat valve device toward the low pressure space.

In one development, in the case of actuation of the one (in particular, mechanically actuable) valve body of the relief seat valve device, a relief pressure medium flow path can be configured from the interior space via the valve seat which is assigned to said valve body toward the low pressure space. The interior space can thus be relieved independently of the pressure limiting function, in particular in the course of a mechanical actuation of the bush body in order to release the coupling and/or the coupling plug.

In one development, a diameter of the first spring is greater than that of a sealing section of the hydraulically actuable valve body. In order for it to be possible for the first spring to be supported on said sealing section, in one development, a supporting section which is separate from said sealing section or is formed in one piece with it is provided, against which the first spring bears with an end section. The supporting section thus transmits the force between said sealing section and the first spring.

In a manner which is less complicated in terms of apparatus technology, the supporting section is guided with play in the guiding sleeve. Here, the play is selected in such a way that tilting is prevented.

In one development, edges of the supporting section are rounded or chamfered toward an inner shell face of the guiding sleeve, in order to prevent tilting.

In one preferred development, an edge-side play of the supporting section in the guiding sleeve, a height of the supporting section in the actuating direction, and machining of edges of the supporting section and/or the inner shell face of the guiding sleeve are coordinated in such a way that tilting of the supporting section in the guiding sleeve is prevented.

BRIEF DESCRIPTION OF THE DRAWINGS

In the following, three exemplary embodiments of a coupling bush according to the disclosure will be explained in greater detail in drawings, in which:

FIG. 3 shows one variant of the pressure limiting function in accordance with a second exemplary embodiment; and FIG. 4 shows one variant of the pressure limiting function in accordance with a third exemplary embodiment.

DETAILED DESCRIPTION

Figure 1:
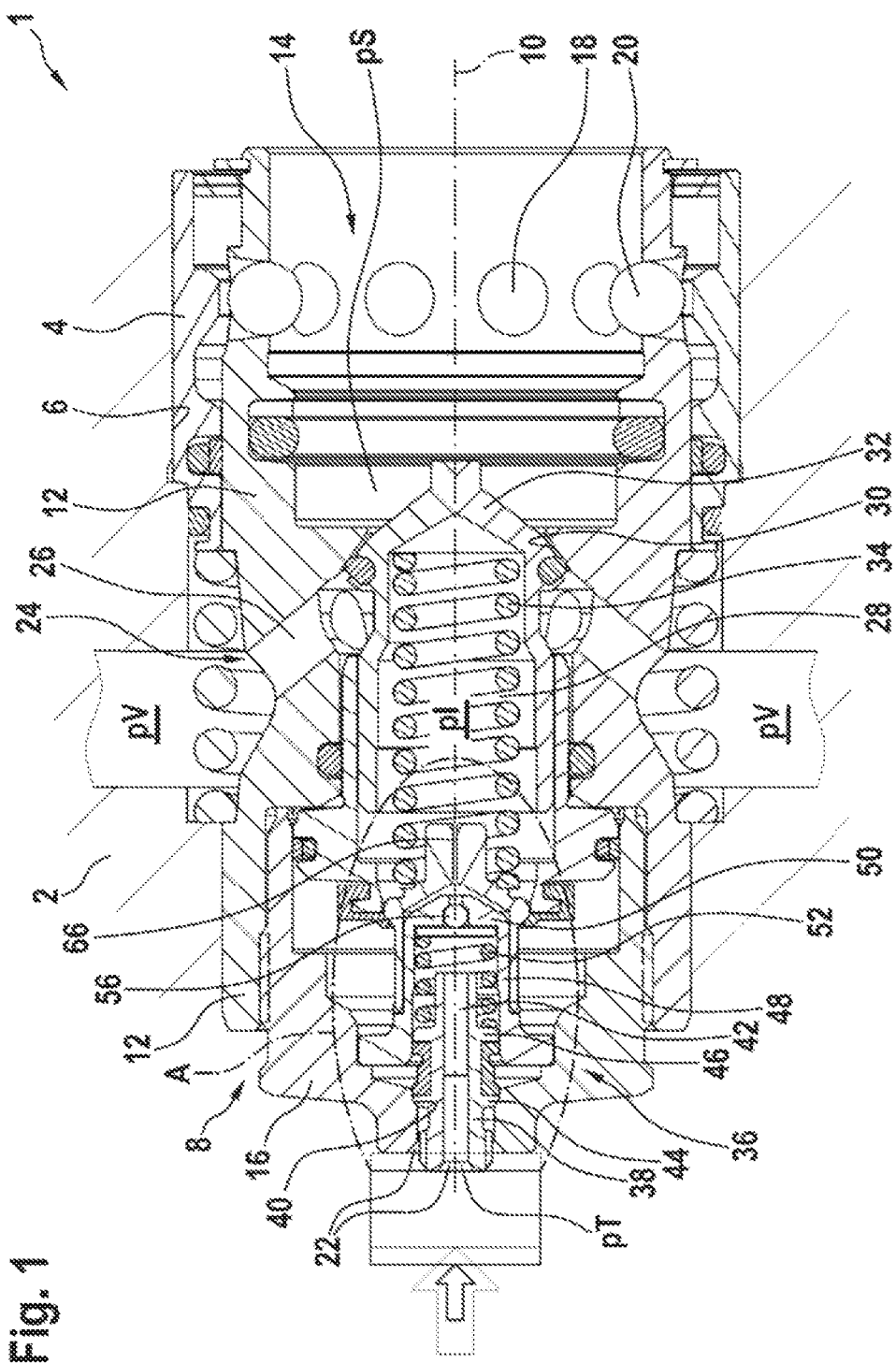
FIG. 1 shows a coupling bush, installed in a valve block, in a longitudinal section in accordance with a first exemplary embodiment.

According to FIG. 1, a hydraulic coupling bush 1 according to the disclosure is used in a valve block 2. Uses on housings of hydraulic components, vessels, hydraulic couplings of mobile work machines or the like are also possible. The coupling bush 1 has a coupling housing 4 which is connected fixedly to the valve block 2. The coupling housing 4 is of substantially cylindrical and sleeve-shaped configuration, and is inserted with its outer circumference into a cylinder bore 6 of the valve block 2 and is fixed axially there. In the coupling housing 4, a two-piece, predominantly sleeve-shaped bush body 8 is guided such that it can be displaced axially along a center axis 10 of the coupling bush 1. In the region of the coupling housing 4, a first part 12 of the bush body 8 has an outwardly open plug space 14 for receiving a coupling plug (not shown) at least in sections. In a manner which is remote from the plug space 14, the first part 12 is connected to a second part 16 of the bush body 8. The second part 16 is configured as a sleeve retainer which is screwed to the first part 12 in the exemplary embodiment which is shown.

Approximately in the region of the plug space 14, the first part 12 has passage recesses 18 which are configured distributed over the full circumference in a star-shaped manner, in each case open conically radially to the outside, and in which a locking ball 20 is received in each case. Independently of the axial position of the bush body 8, a radial stroke of the locking balls 20 is delimited toward the inside by the conical tapering and toward the outside by an inner shell face of the bush housing 4. Here, the inner shell face is provided with a radius which is variable in the axial direction, as a result of which, in the case of axial actuation of the bush body 8 in the direction of the plug space 14, the locking ball 20 gains more stroke radially to the outside. There is thus a release of the coupling or of a locked coupling plug. In this regard, reference is to be made for further explanations to document DE 10 2014 209 278 A1 from the applicant for the purpose of the disclosure.

In a manner which is distal or lying opposite in the axial direction of the plug space 14, the coupling bush 1 has a low pressure space 22 which is in pressure medium connection to a pressure medium sink, for example a tank. Further explanations are also to be dispensed with here, and reference is to be made to document DE 10 2014 209 278 A1 from the applicant for the purpose of the disclosure.

Approximately centrally in relation to the center axis 10, the first part 12 has a radially outwardly pointing supply space 24 which is connected fluidically to an interior space 28 of the bush body 8 via radial-axial bores 26 which are configured in a star-shaped manner.

A supply valve seat 30 (second valve seat 30 in the following text) is configured on the first part 12, with which supply valve seat 30 a pot-shaped valve body 32 (second valve body 32 in the following text) can be brought into contact. The second valve body 32 is loaded via a second spring 34 against the second valve seat 30. Via the seat valve 30, 32 which is configured in this way, a supply pressure medium flow path from the supply space 24 via the second valve seat 30 into the plug space 14 can be controlled or configured.

Furthermore, on its end section which has the low pressure space 22, the coupling bush 1 has a relief seat valve device 36, via the one (mechanical in the exemplary embodiment) actuation of which a pressure relief of the inner space 28 is realized and via the other actuation of which, which is hydraulic in a manner which is dependent on the pressure pI in the interior space 28, limiting of the pressure pI is realized. For the pressure relief, the relief seat valve device 36 has a mechanically actuable valve body 38 (first valve body 38 in the following text) and a valve seat 40 (first valve seat 40 in the following text) which is assigned to it on the second part 16. Its mechanical actuation can take place, for example, via a cam according to FIG. 1 on the left (shown by way of a thick line) and leads to its displacement toward the right in FIG. 1 until the cam bears against the second part 16 (shown by way of a thin line). A further actuation by the cam then leads to the displacement of the bush body 8 toward the right in FIG. 1 and therefore to the release of the coupling with the aim of receiving or releasing a coupling plug. With regard to this procedure, reference is to be made to the disclosure of document DE 1 2014 209 278 A1 from the applicant.

The first valve body 38 is penetrated by a through bore 42 which is coaxial with respect to the center axis 10, and has an outer circumferential collar 44 and 46 in each case on approximately one third and on two thirds of its length. Here, the collar 44 supports a sealing section or a sealing face which can be brought into contact with the first valve seat 40. The other collar 46 is configured as a guiding collar, the first valve body 38 being guided via said guiding collar such that it can be displaced axially in a pot-like guiding sleeve 48. Here, the first valve body 38 projects out of a pot opening of the guiding sleeve 48, and is guided distally by the collar 44 with an end section via an external spline system with the second part 16 such that it can be displaced axially in the latter. In the guiding sleeve 48, in the direction of a pot bottom 50 of the guiding sleeve 48, the first valve body 38 is supported via a first spring 52 which is configured as a compression spring. For reasons of clarity, the further description takes place initially on the basis of FIG. 2.

Figure 2:
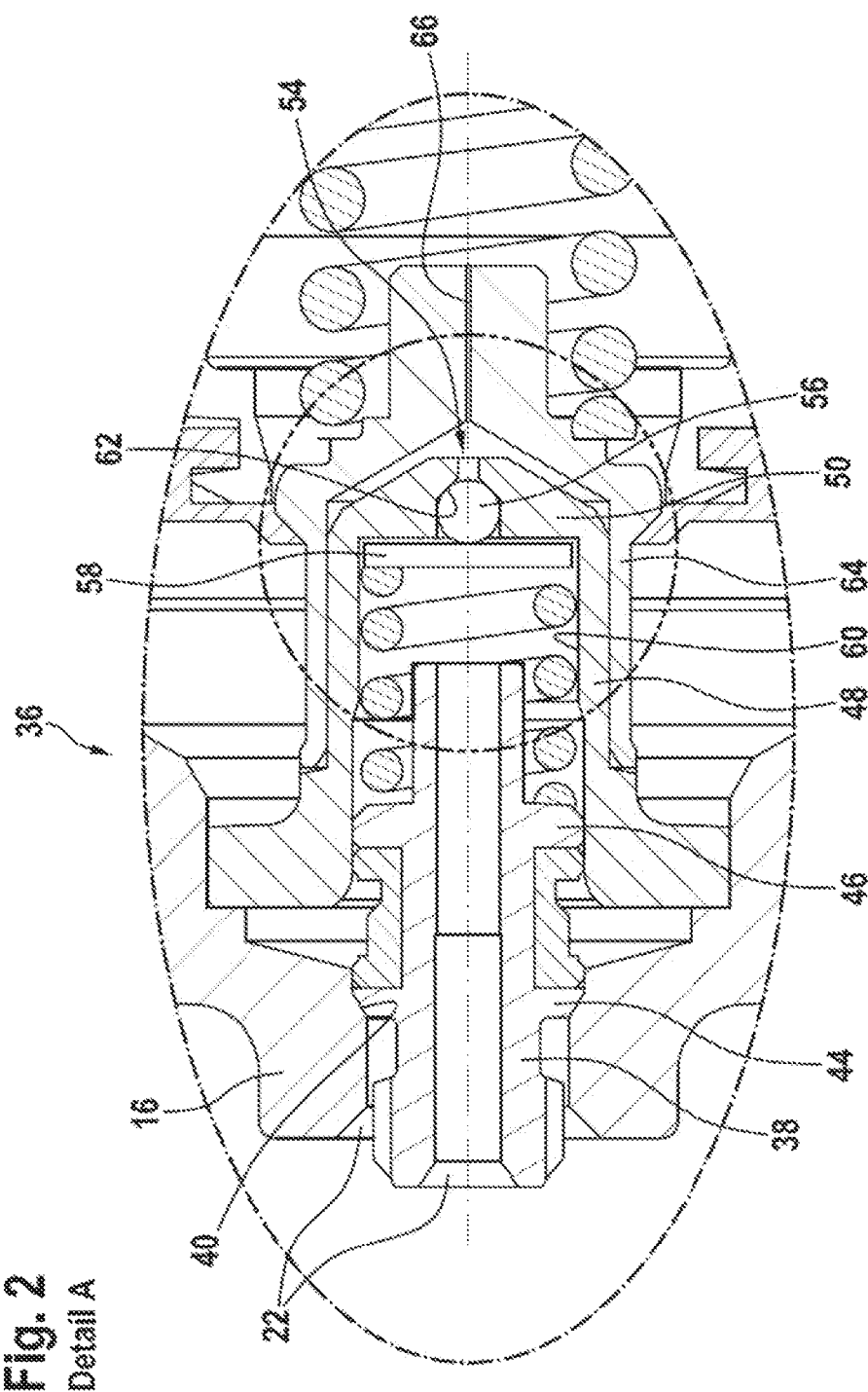
FIG. 2 shows a detail of a pressure limiting function of the coupling bush according to FIG. 1.

FIG. 2 shows the detail A, defined according to FIG. 1, in longitudinal section. According to FIG. 2, the pot bottom 50 is penetrated by a stepped bore 54, into the radially widened end section of which, which points toward the first spring 52, a hydraulically actuable valve body 56 (third valve body 56 in the following text) is inserted. In the exemplary embodiment which is shown, said valve body 56 is configured as a solid body in a metallic and spherical manner. A plate 58 is tensioned by the first spring 52 against the pot bottom 50, which plate 58 is guided with play on the outer circumferential side on an inner shell face 60 of the guiding sleeve 48. The plate 58 covers that radially widened end section of the stepped bore 54 which points toward the first spring 52 and in which the third valve body 56 is arranged. The latter is in contact with the plate 58. Via the first spring 52, the third valve body 56 is loaded into its associated valve seat 62 (third valve seat 62 in the following text), as a result of which, according to FIG. 1, the low pressure space 22 is shut off fluidically with respect to the interior space 28.

In accordance with this exemplary embodiment, the guiding sleeve 48 is pressed with its pot section into a likewise substantially pot-shaped covering sleeve 64. On its bottom, in an adjacent and coaxial manner with respect to the stepped bore 54 of the guiding sleeve 48, the covering sleeve 64 has a throttle bore 66 which penetrates the pot bottom of the covering sleeve 64. A pressure medium connection of the tank space 22 to the interior space 28 according to FIG. 1 can therefore take place only via the throttle bore 66 and when the third valve body 56 lifts up from the third valve seat 62.

In one alternative (not shown) to this, the pot bottom of the covering sleeve 64 is closed, that is to say does not have a throttle bore of this type, and the guiding sleeve 48 is received with its pot section with a defined play in the pot-shaped covering sleeve 64. The gap which results from the play between said pot sections is a throttle gap, via which the tank space 22 can be connected fluidically to the interior space 28. Via said throttle gap, pressure medium which is connected fluidically to the interior space 28 prevails on the third valve body 56. If the latter lifts up from its third valve seat 62, said fluidic connection from the interior space 28 to the tank space 22 is configured.

The further description of the method of operation of the coupling bush 1 in the case of coupling and releasing of the coupling with the hydraulic coupling plug is to be dispensed with at this point, and reference is again to be made to the disclosure of document DE 10 2014 209 278 A1. Only fundamental states and actuating operations of the coupling bush 1 which are necessary for the understanding of the disclosure will be described in the following text.

FIG. 1 shows a basic state of the coupling bush 1, in which basic state no coupling plug is coupled in and the plug space 14 is accordingly free. Furthermore, the mechanically actuable first valve body 38 and the hydraulically actuable second valve body 56 of the relief seat valve arrangement 36 are not actuated. Accordingly, the two valve bodies 38 and 56 are seated in their associated valve seat 40 and 62, respectively, according to FIG. 2. Therefore, neither a pressure relief nor pressure limiting with regard to the pressure pI in the interior space 28 takes place.

Furthermore, it is to be assumed that a supply pressure pV prevails in the supply space 24. Furthermore, it is to be assumed that the supply space 24 is shut off in the backward direction by a control valve (not shown). Accordingly, according to FIG. 1, the interior space 28 is shut off in a pressure-tight manner at the first valve seat 40 and third valve seat 62 according to FIG. 2 and at the second valve seat 30 according to FIG. 1. The enclosed pressure medium volume is subject to thermal fluctuations and therefore to a change in its density. Accordingly, the pressure pI in the interior space 28 also changes. In the exemplary embodiment which is shown, said pressure prevails via the throttle bore 66 and the stepped bore 54 at the end side of the hydraulically actuable, third valve body 56 of the relief seat valve device 36. This also applies to the above-addressed alternative without said throttle bore, the pressure pI in this case then prevailing via the abovementioned gap between the guiding sleeve 48 and the covering sleeve 64. If the pressure pI then exceeds a pressure equivalent of the first spring 52 according to FIGS. 1 and 2, the third valve body 56 lifts up from the third valve seat 62 according to FIG. 2, and, in the exemplary embodiment which is shown, a pressure limiting flow path is formed from the supply space 24 according to FIG. 1, via the radial bore 26, to the interior space 28 and, from the latter, via the throttle bore 66, the stepped bore 54 and the passage recess 42 toward the low pressure space 22. Accordingly, pressure medium is discharged from the interior space 28, and the pressure pI in the interior space 28 drops until the spring 52 presses the third valve body 56 into the third valve seat 62 again. This represents the pressure limiting function.

The function of the mechanically actuable, first valve body 38, in interaction with the first valve seat 40 for the pressure relief in the run-up to an actuation of the bush body 8, for releasing the plug space 14 or for decoupling the coupling plug, is described in detail in document DE 10 2014 209 278 A1, with the result that reference is also to be made to its disclosure at this point.

FIGS. 3 and 4 show a second and third exemplary embodiment in the region of the hydraulically actuable, third valve body.

According to FIG. 3, in a difference from the first exemplary embodiment according to FIGS. 1 and 2, the plate 158 is not closed, but is rather configured with a coaxial through bore 68. The spherical third valve body 56 comes to lie on the edge of said through bore 68 in a manner which is centered distally by the valve seat 162. In the case of the above-described lifting of the third valve body 56 from the third valve seat 162, the third valve body 56 presses the plate 158 to the left in FIG. 3, as a result of which the above-described pressure limiting flow path is configured. Here, as was already the case in the first exemplary embodiment, the pressure medium has to flow past the valve body 56 and, in addition, on the outer circumferential side through a gap which is configured by play between the plate 158 and the inner shell face 60 of the guiding sleeve 48.

FIG. 4 shows a third exemplary embodiment with a hydraulically actuable, third valve body 256, a plate 258 then being formed in one piece with the spherical valve body 256 and being arranged approximately at the level of its equator. On account of the single-piece nature, there is no longer any relative movement between the plate 258 which has the guiding function and the valve body 256 which has the sealing function. As was already the case in the two above-described exemplary embodiments, the pressure medium has to flow past the valve body 256 and, in addition, on the outer circumferential side through a gap which is formed by play between the plate 258 and the inner shell face 60 of the guiding sleeve 48.

Via the described overall design, the mechanically and hydraulically actuable relief seat valve device 36 is divided physically into two coaxially arranged relief seat valves: into a relief seat valve which, in particular, can be actuated mechanically for the pressure relief of the interior space 28 which has the first valve body 38 and first valve seat 40, and into a hydraulically actuable relief seat valve for limiting the pressure pI in the interior space 28 which has the third valve body 56; 256 and the third valve seat 62; 162; 262. Unlike in the case of the solution according to the prior art, in the case of which the two functions, the pressure relief in the case of mechanical actuation and the pressure limiting by means of hydraulic actuation, are fulfilled via the same valve body, the respective function or the respective valve body and valve seat can therefore be designed and manufactured separately from one another. This simplifies the design and manufacture.

The hydraulically actuable seat valve with its third valve body 56; 256, third valve seat 62; 262 and the first spring 52 has the following features with regard to a design and optimization:

The softer the first spring 52, the smaller a tolerance of the necessary opening pressure pI. It is therefore possible that an adjusting possibility for the spring prestress of the first spring 52 can be dispensed with.

The smaller the diameter of the third valve body 56; 256, the smaller spring forces of the first spring 52 are necessary. In the case of a great spring force, however, a greater diameter of the third valve body 56; 256 is also possible.

The throttle bore 66 and the stepped bore 54; 154; 254, in particular its radially constricted section, lead to a small pressure limiting flow on account of their throttle action, with the result that, after an opening lift of the third valve body 56; 256, the latter moves back into the third valve seat 62; 262 in an improved manner.

A more acute seat angle of the third valve seat 62; 262 likewise leads to the third valve body 56; 256 moving back into its third valve seat 62; 262 in an improved manner.

Overflow channels which are configured circumferentially around the third valve body 56; 256 in the stepped bore 54; 154, for example are milled or tumbled, in particular with a Torx-shaped or other star-shaped cross section, make optimum guidance of the third valve body 56 in the stepped bore 54; 154 possible.

Rounded outer circumferential edges of the plate 58; 158; 258 and/or soft material there prevent catching of the plate 58; 158; 258 during its guidance in the guiding sleeve 48.

A small play of the plate 58; 158; 258 in the guiding sleeve 48 makes it possible for a tilted position and therefore transverse forces on the third valve body 56; 256 to be avoided. The latter thus moves reliably into its third valve seat 62; 262.

A hydraulic coupling bush for coupling to a hydraulic coupling plug is disclosed, with a supply seat valve device, via the actuation of which a supply flow path can be configured between a supply space and a plug space of the coupling bush, and with a relief seat valve device, via the actuation of which firstly an interior space of the coupling bush can be relieved of pressure toward a pressure medium sink, and secondly a pressure in the interior space can be limited. Here, in each case one valve body with an associated valve seat can be provided separately from one another for the pressure relief and the pressure limiting, and said valve bodies are arranged coaxially with respect to one another.

LIST OF REFERENCE SIGNS

1 Coupling bush
2 Valve block
4 Coupling housing
6 Inner shell face
8 Bush body
10 Center axis
12 First part
14 Plug space
16 Second part
18 Passage recess
20 Locking ball
22 Low pressure space
24 Supply space
26 Radial bore
28 Interior space
30 Second valve seat
32 Second valve body
34 Second spring
36 Relief seat valve device
38 First valve body
40 First valve seat
42 Passage recess
44 Sealing collar
46 Guiding collar
48 Guiding sleeve
50 Pot bottom
52 First spring
54 Stepped/throttle bore
56; 256 Third valve body
58; 158; 258 Plate
60 Inner shell face
62; 262 Third valve seat
64 Covering sleeve
66 Throttle bore
68 Through bore
pV Pressure, supply space
pS Pressure, plug space
pI Pressure, interior space
pT Pressure, low pressure space

What is claimed is:

1. A hydraulic coupling bush for coupling to a hydraulic coupling plug, comprising:
a coupling housing
a bush body which configured to be displaced within the coupling housing, and configured to be actuated in order to close or open the coupling, the bush body including
a plug space configured to receive at least sections of the coupling plug and configured for fluidic connection of said coupling plug,
a supply space configured to be fluidically connected to an external supply channel,
a low pressure space configured to be fluidically connected to a pressure medium sink, and
an interior space fluidically connected to the supply space;
a supply seat valve device via the actuation of which a supply flow path is configured between the supply space and the plug space;
a relief seat valve device via a first actuation of which the interior space is relieved of pressure toward the low pressure space, and via a second actuation of which, which is dependent on the pressure in the interior space, the pressure in the interior space is limited, wherein the relief seat valve device has an actuable first valve body with an associated first valve seat for the pressure relief, and a second valve body which is actuated in a manner which is dependent on the pressure in the interior space and has an associated second valve seat for the pressure limiting, wherein the first and second valve seats are arranged coaxially.

2. The coupling bush according to claim 1, wherein the first and second valve bodies have actuating directions which are opposed.

3. The coupling bush according to claim 1 wherein the first and second valve bodies of the relief seat valve device are coupled via a first spring, the first spring biasing the first and second valve bodies toward the respective associated valve seat.

4. The coupling bush according to claim 3 wherein:
a diameter of the first spring is greater than that of the sealing section of the second valve body; and
the coupling bush further comprises a supporting section on which the first spring is supported.

5. The coupling bush according to claim 4 wherein:
the supporting section is separate from the sealing section and is movable.

6. The coupling bush according to claim 4 wherein:
the supporting section is fixed with respect to the sealing section.

7. The coupling bush according to claim 1, further comprising:
a second spring coupling a mechanically actuable valve body of the supply seat valve device and the second valve seat, the second spring biasing the mechanically actuable valve body and the second valve seat toward their respective closing directions counter to their respective actuating direction.

8. The coupling bush according to claim 7, wherein the first valve body and the mechanically actuable valve body have opposed actuating directions.

9. The coupling bush according to claim 1, further comprising:
a guiding sleeve in which the first and second valve bodies are arranged and guided in series.

10. The coupling bush according to claim 6, wherein the guiding sleeve is pot-shaped, and the first valve body projects out of a pot opening of the guiding sleeve.

11. The coupling bush according to claim 10, wherein the second valve seat is configured on a pot bottom of the guiding sleeve which, starting from the second valve seat, is penetrated in the direction of the interior space by a first throttle bore.

12. The coupling bush according to claim 1, wherein a sealing section of the second valve body is a solid ball.

13. The coupling bush according to claim 9, wherein:
the first and second valve bodies of the relief seat valve device are coupled via a first spring, the first spring biasing the first and second valve bodies toward the respective associated valve seat;
a diameter of the first spring is greater than that of the sealing section of the second valve body; and
the coupling bush further comprises a supporting section on which the first spring is supported.

14. The coupling bush according to claim 13 wherein:
the supporting section is separate from the sealing section and is movable.

15. The coupling bush according to claim 13 wherein:
the supporting section is fixed with respect to the sealing section.

16. The coupling bush according to claim 1, wherein a sealing section of the second valve body is a solid cone.

\* \* \* \* \*